(12) United States Patent
Kegel

(10) Patent No.: US 7,551,124 B2
(45) Date of Patent: Jun. 23, 2009

(54) METHOD FOR OPTIMISING AT LEAST ONE PROPERTY OF A SATELLITE SYSTEM, OPTIMISATION DEVICE FOR A SATELLITE SYSTEM, SATELLITE RECEIVER AND SATELLITE SYSTEM

(75) Inventor: Jacobus Adrianus Kegel, Hoogeveen (NL)

(73) Assignee: Stichting ASTRON, Dwingeloo (NL)

( * ) Notice: Subject to any disclaimer, the term of this patent is extended or adjusted under 35 U.S.C. 154(b) by 0 days.

(21) Appl. No.: 10/561,879

(22) PCT Filed: Jun. 23, 2003

(86) PCT No.: PCT/NL03/00463
§ 371 (c)(1),
(2), (4) Date: Oct. 31, 2007

(87) PCT Pub. No.: WO2004/114547
PCT Pub. Date: Dec. 29, 2004

(65) Prior Publication Data
US 2008/0094276 A1  Apr. 24, 2008

(51) Int. Cl.
*H04B 7/185* (2006.01)

(52) U.S. Cl. ..................... 342/354; 342/352
(58) Field of Classification Search ............... 342/174, 342/352, 354, 357.02, 368, 372; 455/12.1, 455/13.2
See application file for complete search history.

(56) References Cited

U.S. PATENT DOCUMENTS

| 5,861,843 A | 1/1999 | Sorace et al. ............. 342/372 |
| 5,929,804 A | 7/1999 | Jones et al. .............. 342/354 |
| 2003/0022649 A1 | 1/2003 | Voyer .................... 455/277.1 |

FOREIGN PATENT DOCUMENTS

| DE | 19639414 | 4/1998 |
| EP | 0 991 220 | 4/2000 |

*Primary Examiner*—Dao L Phan
(74) *Attorney, Agent, or Firm*—Michaelson & Associates; Peter L. Michaelson

(57) ABSTRACT

A method for optimizing at least one property of a satellite system. The system has a satellite provided with a transmitter for transmitting a satellite signal that represents data. The satellite further has a satellite receiver for receiving the satellite signal. The method involves receiving the satellite signal, via the satellite receiver; determining the data from the satellite signal so received; checking the data for data errors; and changing the at least one property of the satellite system if a result of the checking satisfies a predetermined criterion.

19 Claims, 4 Drawing Sheets

METHOD FOR OPTIMISING AT LEAST ONE PROPERTY OF A SATELLITE SYSTEM, OPTIMISATION DEVICE FOR A SATELLITE SYSTEM, SATELLITE RECEIVER AND SATELLITE SYSTEM

FIELD AND BACKGROUND OF THE INVENTION

The invention relates to a method for optimising a property of a satellite system. The invention further relates to an optimisation device for at least one property of a satellite system, a satellite receiver, a satellite system, a satellite tracking system and a computer program product.

In the art satellite systems are known comprising a transmitter in a satellite which can transmit a satellite signal and a satellite receiver which can receive a satellite signal. Usually, the satellite receiver is an antenna system on the ground at a distance from the satellite. Often, the satellite broadcasts television signals and the satellite receiver is used to receive the television signals, however other data can also be received and transmitted. In the art satellite system are known in which the satellite receiver has one single dish or lens shaped antenna. A dish or lens shaped antenna has a fixed antenna beam width which is usually 3 degrees or less to assure receiving signals from just one satellite at a time. The fixed antenna beam width assures an optimal pointing of the dish or lens shaped antenna towards the satellite after positioning. The positioning of the dish or lens shaped antenna is performed by mechanically pointing the antenna beam towards the transmitter. This mechanical positioning is usually performed by positioning the dish shaped antenna in the predetermined position, e.g. with the antenna beam pointing in a predetermined direction in the sky.

A disadvantage of a satellite receiver provided with one single dish or lens shaped antenna is that the properties of the satellite receiver, such as the direction, polarisation, or width of the antenna beam, are either fixed or difficult to adjust. This is particularly disadvantageous when for example signals from another transmitter have to be received or the relative position of the transmitter or the satellite receiver with respect to each other change, for instance when the satellite receiver is mounted on a car, boat or other moving object or when the satellite is not in a geostationary orbit.

In the art also satellite systems are known in which the satellite receiver comprises a so called beam forming antenna array with two or more antenna elements instead of a single dish shaped antenna. Properties of the antenna array or other parts of the satellite system, such as the beam width and beam direction, can be adjusted electronically. However, to optimise or adjust one of more properties or the satellite system, additional methods and devices are required to adjust or optimise one or more aspects of the satellite system.

From the United States patent publication 5 929 804, a method and system for optimising reconfiguration of a reconfigurable zonal beam forming system for an antenna on a satellite in orbit is known. The method and system optimise the phase changes of phase shifters and attenuation of attenuators in the reconfigurable zonal beam forming system. In the optimisation, an error function is defined and using Butler matrixes desired values of the phase shifts and attenuators are determined.

However, a disadvantage of the prior art known from this patent publication is that it requires a large amount of processing power, because of the matrix manipulation involved.

SUMMARY OF THE INVENTION

It is an object of the invention to provide an improved method for optimising at least one property of a satellite system, more specific it is a goal of the invention to provide a method which is more flexible.

This property of the satellite system is changed when the data error check satisfies a predetermined criterion. The data error is a measure for the quality of the signals outputted by the satellite receiver. Hence, the property can be optimised by increasing the quality of the signals by adjusting this property. The method is flexible because the data error at least partially depends on properties other than the phase shift and attenuation, and hence can be used to optimise such properties. Furthermore, determination of the data error can be performed in a simple manner.

The invention further provides an optimisation device which can be implemented in a satellite system and used to optimise one or more properties of the satellite system.

The invention also provides an satellite receiver, satellite system and a computer program product.

Specific embodiments of the invention are set forth in the dependent claims. Further details, aspects and embodiments of the invention will be described by way of example only with reference to the figures in the attached drawings.

DETAILED DESCRIPTION

It should be noted that in this application, the term 'antenna beam' refers to both the pattern of transmitted radiation of a transmitting antenna as well as the pattern of radiation which can be received with a receiving antenna.

Figure 1:
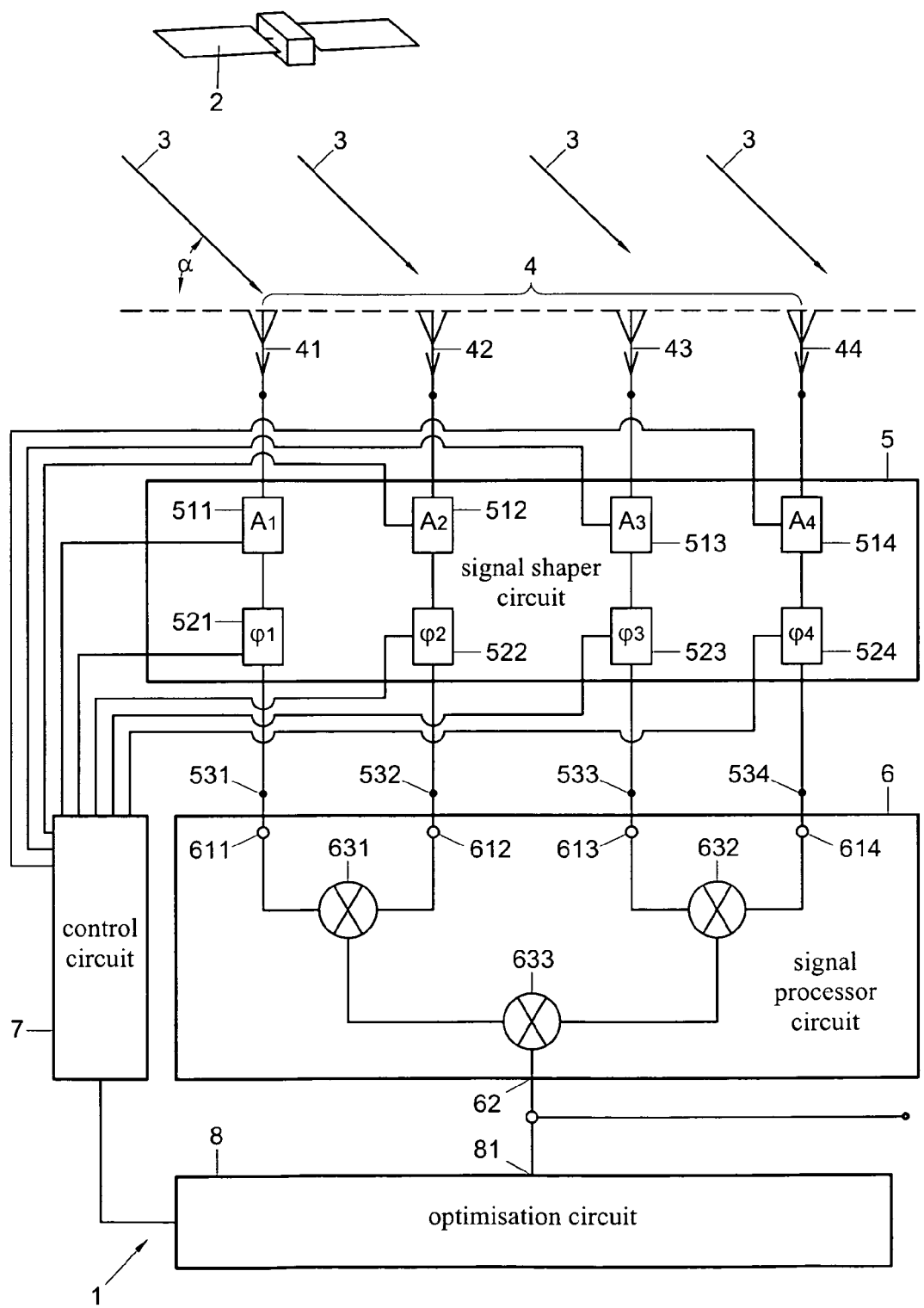
FIG. 1 schematically shows a block diagram of an example of an embodiment of a satellite system according to the invention.

The example of a satellite system of FIG. 1 comprises a satellite 2 provided with a transmitter and an example of a satellite receiver, which in this case comprises a phased array antenna system 1. The satellite receiver can receive a satellite signal 3 from the satellite 2. The satellite receiver is positioned on a celestial body, e.g. the earth, and the satellite 2 is in orbit around the celestial body. However, the satellite receiver may likewise be in the air or in space and for example be in an airplane or be a part of a satellite. In the example of FIG. 1, the satellite receiver comprises an antenna system with an antenna array, in this example a phased antenna array. Array antenna systems as well as phased array antenna systems are generally known in the art of antennas, for example from U.S. Pat. No. 6,232,919, and for the sake of brevity are not described in full detail.

The phased array antenna system 1 comprises an antenna array 4 which can receive the satellite signal 3 from the satellite 2. The phased array antenna system 1 further comprises a signal shaper circuit 5 which is connected to the antenna array 4. A signal processor circuit 6 is connected to outputs 531-534 of the signal shaper circuit 5. A control circuit 7 is connected to control devices in the signal shaper circuit 5. An example of an optimisation circuit 8 according to the invention is connected to the signal processor circuit 6 and the control circuit 7.

As is shown in FIG. 1, the satellite signal 3 is incident on the antenna array 4 within the sight of the antenna system 1 at an angle α. The antenna array 4 comprises four antenna elements 41-44 positioned in a row. The antenna elements 41-44 can receive a satellite signal 3 transmitted from the satellite 2. However, it should be noted that in general any number of antenna elements may be used and the invention is not limited to the shown number of antenna elements. Furthermore, the antenna elements may likewise be positioned in an arrangement different from the line-shaped one dimensional arrangement in FIG. 1 such as, depending on the specific implementation, a random distribution, in a matrix shaped two-dimensional arrangement, a three dimensional arrangement or otherwise.

The signal shaper circuit 5 comprises amplifier circuits 511-514. The input of each of the amplifier circuits 511-514 is connected to a different one of the antenna elements 41-44. Each of the amplifier circuits 511-514 is connected in series to a time or phase shifter circuit 521-524. The outputs of the time or phase shifter circuits 521-524 are connected to the outputs 531-534 of the signal shaper circuit 5.

The amplifier circuits 511-514 each have an adjustable amplification factor $A_1 \ldots A_4$ which can be controlled by providing a suitable signal at an amplifier control input of the respective one of the amplifier circuits 511-514. The amplification factor $A_1 \ldots A_4$ may be any amplification factor suitable for the specific implementation and may even be smaller than one, in which case the respective amplifier circuit operates as an attenuator circuit. The time or phase shifter circuits 521-524 have an adjustable time or phase shift $\phi_1 \ldots \phi_4$. The phase shift $\phi_1 \ldots \phi_4$ is controllable by providing a suitable signal at a phase shift control of the respective one of the time or phase shifter circuits 521-524.

In the example of FIG. 1, a control circuit 7 is connected to the control inputs of the amplifier circuits 511-514 and the time or phase shifter circuits 521-524. The control circuit 7 controls the time or phase shifts $\phi_1 \ldots \phi_4$ and the amplification factors $A_1 \ldots A_4$ via the respective control. Via a suitable control of the time or phase shift and/or the amplification factors, the control circuit 7 can thus form an antenna beam having a given radiation pattern in a specified direction, e.g. in the direction of the satellite, and the control circuit 7 can therefore perform functions of a beam control device or a beam forming device. Beam forming and beam control techniques for antenna arrays are generally known in the art of phased array antennas and for the sake of brevity the beam forming and beam control functions of the control circuit 7 are not described in further detail. However, any beam former device or beam forming method suitable for the specific implementation may be used in the control circuit 7.

The control circuit 7 can adjust the adjustable time or phase shift $\phi_1 \ldots \phi_4$ of the time or phase shifter circuits 521-524 and the adjustable amplification factor $A_1 \ldots A_4$ of the amplifier circuits 511-514 to form an antenna beam with suitable characteristics to receive the satellite signal 3. The control circuit 7 can also change the time or phase shifts and the amplifications to steer the antenna beam, form a different antenna beam, or the like. Typically, the amplification of each of the amplifier circuits 511-514 is set by the control circuit 7 approximately at a common level such that the signals from the different antenna elements 41-44 have substantially the same amplitude. However, the control circuit 7 may likewise set the amplifications differently.

The phase array antenna system 1 can be used either as a transmitter or a receiver, thus acting in a transmit mode or in a receive mode respectively. In the transmit mode, the signal processor circuit 6 feeds signals through the respective time or phase shifter circuits 521-524 and amplifier circuits 511-514 to each antenna element 41-44 for transmission of an array antenna signal. In the transmit mode, the signal processor circuit 6 may use a signal splitter (not specifically shown) for splitting a single signal into the signals to be fed to the antenna elements 41-44. The control circuit 7 is operable to control each of the time or phase shifter circuits 521-524 and the amplifier circuits 511-514 to change the phase and the amplitude of the signals fed to the antenna elements 41-44. In the transmit mode, the control circuit 7 thus sets the phases and the amplitudes of these signals to form a transmission beam having a given radiation pattern in a specified direction. The control circuit 7 can change the adjustable time or phase shifts $\phi_1 \ldots \phi_4$ and/or the adjustable amplifications $A_1 \ldots A_4$ to steer the transmission beam, form a different transmission beam, or the like. Typically, in the transmit mode each of the amplifier circuits 511-514 is set approximately at a suitable common level such that the antenna elements 41-44 are driven by the signal processor circuit 6 in the same manner. However, these levels may be varied for example for beam shaping or to obtain an equal signal intensity.

In the receive mode, the antenna elements 41-44 provide received signals, e.g. the satellite signal 3, received from an external source, e.g. the satellite 2, through the respective phase shifters 521-524 and attenuators 511-514 in the signal shaper circuit 5 to the signal processor circuit 6. In the receive mode, the signal processor circuit 6 may use a combiner for combining the received signals into a single signal. The control circuit 7 is operable with the time or phase shifter circuits 521-524 and the amplifier circuits 511-514 to change the phase and the amplitude of the signals received by antenna elements 41-44. The control circuit 7 sets the time or phase shifts and the amplification to form a reception pattern in a specified direction. The control circuit 7 can also change the time or phase shifts and/or the amplification factors to steer the reception pattern, form a different reception pattern, or the like. Typically, in the receive mode each of amplifier circuits 511-514 is set approximately at a suitable common level such that each of antenna elements 41-44 feed the signal processor circuit 6 in the same manner. However, these levels may be varied, for example for beam shaping or beam direction purposes.

In the example of FIG. 1, the signal processor circuit 6 comprises processor inputs 611-614 which are connected to the outputs 531-534 of the signal shaper circuit 5. The processor inputs 611-614 are communicatively connected to a processor output 62 of the signal processor circuit 6 via combiner devices 631-633.

In this example, the phase array antenna system 1 is used in a receive mode and the signal processor circuit 6 comprises combiner devices 631-633 connected in a suitable manner. The combiner devices 631-633 combine the signals provided at the different outputs 531-534 into a single antenna output signal which is presented at the processor output 62. In the example of FIG. 1, the processor output is connected to the optimisation circuit 8, however the processor output 62 may also be connected to other devices, e.g. an output of the satellite receiver or otherwise.

In the example of FIG. 1, the signal processor comprises a combiner circuit, however the circuitry of the signal processor circuit 6 may likewise comprise any other signal processing means suitable for the specific implementation. For example, if the antenna system 1 is used in a transmit mode, the circuitry in the signal processor circuit 6 may comprise one or more signal splitters which split a signal to be transmitted into a number of signals suitable to be fed to each of the antenna elements 41-44 via the terminals 531-534 of the signal shaper circuit 6.

Figure 2:
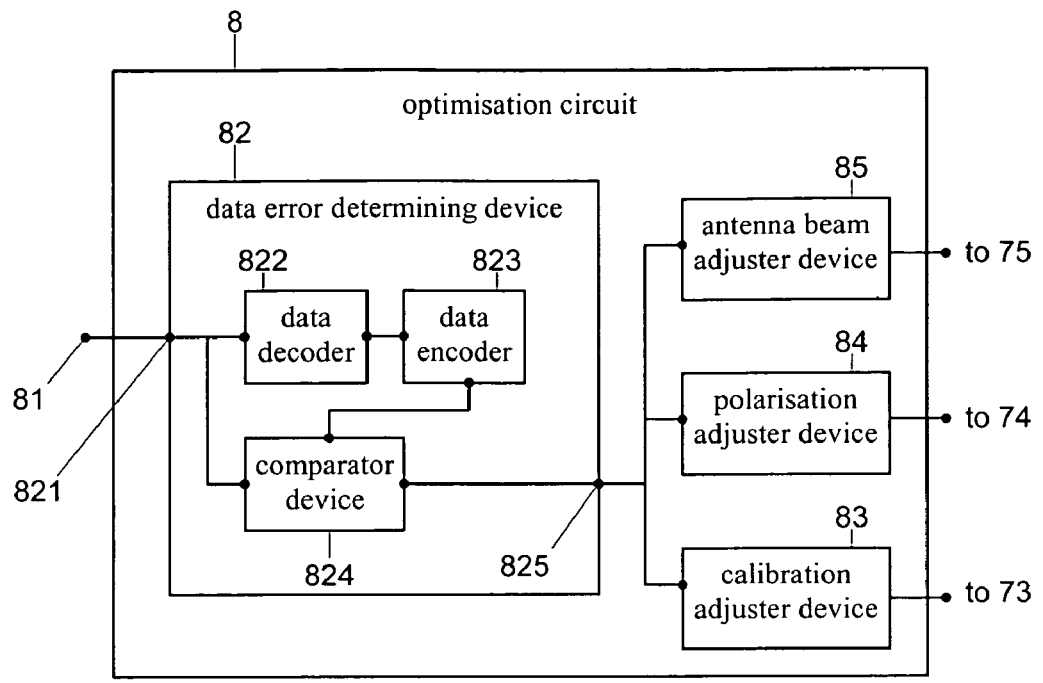
FIG. 2 schematically shows a block diagram of an example of an embodiment of an optimisation circuit suitable for the example of a satellite system of FIG. 1.

In the example of a satellite receiver of FIG. 1, the optimisation circuit 8 may for instance be implemented as shown in FIG. 2. The optimisation circuit 8 of FIG. 2 has an optimisation input 81 at which a signal representing received data can be presented, i.e. the antenna output signal. The optimisation input 81 may for example be connected to the processor output 62 of the example of a satellite receiver of FIG. 1. An error input 821 of a data error determining device 82 is connected to the optimisation input 81. The data error determining device 82 further has an error output 825 for outputting an error signal which represents a result of the process of determining data errors. Connected to the error output 825 are adjuster devices 83-85 which can output a signal for adjusting a property of the satellite system in response to the error signal.

The data error determiner device 82 can determine data errors in the received data. Thus when used in the example of FIG. 1, the data error determining device 82 can determine data errors in the data represented by the antenna output signal.

In the example of an optimisation device 8 in FIG. 2, the data error determining device 82 is especially suited for determining data errors in binary data coded with a coding algorithm, in this example an algorithm according to the Digital Video Broadcasting (DVB) standard, which is an MPEG-2 compliant coding algorithm, as is generally known in the art of data coding and for the sake of brevity not described in further detail. The data error determining device 82 comprises a data decoder 822, in this example an DVB decoder, which is connected to the error input 821. The DVB decoder 822 can decode DVB encoded data signal and output the decoded data at a decoder output. The output of the data decoder 822 is connected to an encoder input of a data encoder 823, which in this example is an DVB encoder. The DVB encoder can present encoded data at an encoder output which encoded data is encoded with a suitable coding algorithm, i.e. an DVB coding algorithm. The encoded data is presented at the encoder output to a first input of a comparator device 824. At a second input of the comparator device 824 the received data represented by the signal presented at the error input 81 is presented. The comparator 824 compares the encoded data with the received data and determines data errors in the received data. The encoded data at the encoder output is similar to the received data but corrected for errors because of an automatic error correction which is built-in in DVB algorithms and thus present in the DVB decoder 822 and the DVB encoder 823. Hence, the comparator 824 can determine data errors in received data, e.g. the data represented by the satellite signal, by comparing the received data with the encoded data provided by the encoder 823. Via a comparator output which is connected to an error output 825 of the data error determiner device 82, the comparator 824 can provide a signal which represents a property of the data errors, such as the amount of errors relative to the amount of data (which for binary data may be the bit error ratio or BER), the absolute amount of data errors per time unit or otherwise.

It should be noted that the invention is not limited to the shown example of a data error determining device. The data error determining device may be implemented in any manner suitable for the specific implementation and be able to perform any suitable data error detection technique. Data error detection techniques are generally known, for example from L. Peterson and B. Davie, "*Computer networks, a systems approach*", 2$^{nd}$ edition, Morgan Kaufman 2000, p. 92-96 incorporated herein by reference.

The data error determining device may for example comprise a Viterbi error decoder or a Reed-Solomon decoder which determines the data errors via Viterbi or Reed-Solomon forward error correction. For the sake of brevity the Viterbi algorithm and Reed-Solomon error correction coding are not described in further detail, as these are generally known in the art of error coding for example from K. Sayood, "*Introduction to data compression*", 2$^{nd}$ edition, Morgan Kaufman 2000, p. 301-305.

Digital broadcasting satellites transmit satellite signals representing binary data coded with an coding algorithm which is based on MPEG-2, this coding algorithm is defined in the DVB standard. As a part of the DVB coding, additional data bits are added to the binary data for forward error correction. DVB compliant forward error correction in general uses two types of forward error correction: convolution error correction coding with the so called Viterbi algorithm and coding with the Reed-Solomon error correction coding.

Hence, a data error determining device comprising a Viterbi error coder or a Reed-Solomon coder is especially suited for a satellite signal representing DVB compliant data. Thereby, data error detection techniques are used which are already implemented in the satellite signal and few additional measures are required to implement the data error determination. However, the invention is not limited to system using the DVB standard and other types of bit-error detection techniques may likewise be used.

For example, if the satellite signal represents binary data, the data error determining device may be a parity check device which performs a parity check. In general, in a parity check the values of bits in a string of data are added up. If the added values are an even number, a binary one is outputted and when the added values are an uneven number a binary zero is outputted. The binary one or binary zero is compared with a reference bit sent together with the string of data, which reference bit represents whether the added values should be even or uneven and hence errors in the string of data can be detected.

In the example of FIG. 2, the error output 825 of the data error determining device 82 is connected to adjuster devices 83-85. The adjuster devices 83-85 receive an error signal from error output 825 and in response to the error signal provide an adjust signal related to one or more properties of the satellite system. The adjust signal can than be used by an actuator for adjusting the respective property. In the example of FIG. 2, the adjuster devices comprise a calibration adjuster device 83, a polarisation adjuster device 84 and an antenna beam adjuster device 85. However, the optimisation circuit 8 may likewise comprise other adjuster devices for adjusting one or more other properties of the satellite system, such as a satellite position adjuster device for adjusting the position of the satellite with respect to the satellite receiver, adjusting the direction in which the transmitter transmits a signal or otherwise. The optimisation circuit 8 may be present in a satellite receiver, for example, and be communicatively connected to a satellite at a distance from the satellite receiver. The optimisation circuit may then send satellite adjust data to the satellite in response to which satellite adjust data devices in the satellite change the property of the satellite to be optimised.

Figure 3:
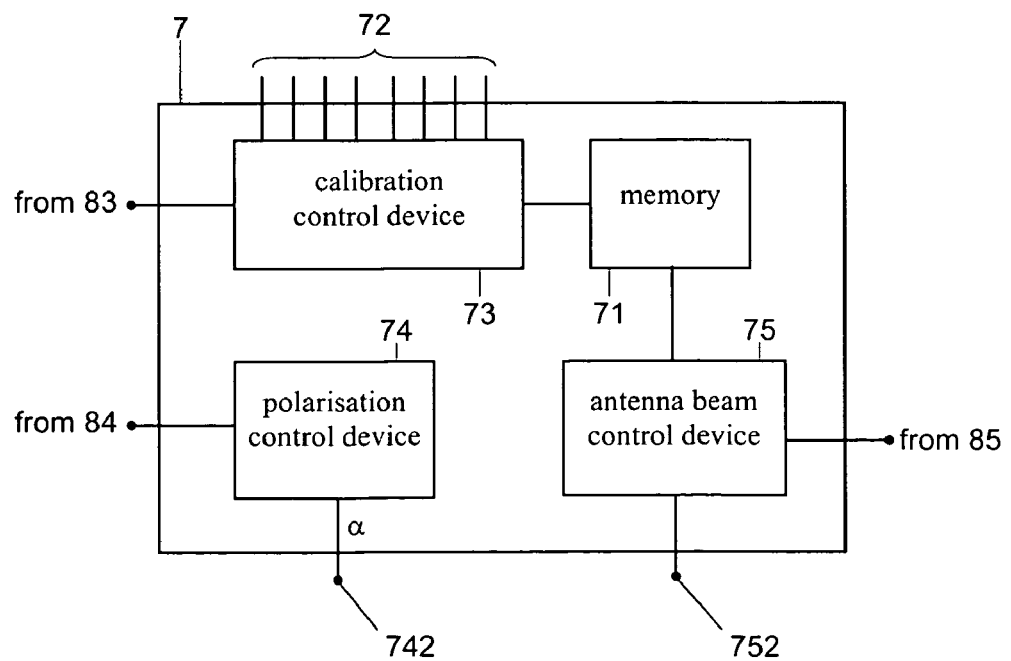
FIG. 3 schematically shows a block diagram of an example of an embodiment of a control circuit suitable for the example of a satellite system of FIG. 1.

The control circuit 7 in the example of FIG. 1 is shown in more detail in FIG. 3. The control circuit 7 comprises a calibration control device 73. The calibration control device 73 is connected to the calibration adjuster device 83 in the optimisation device 8. The control device 7 further comprises a polarisation control device 74 and an antenna beam control device 75. The polarisation control device 74 is connected to the polarisation adjuster device 84 in the optimisation circuit 8. The antenna beam control device 75 is connected to the antenna beam adjuster device 85 in the optimisation circuit 8.

The calibration control device 73 has control outputs 72 which are connected to control inputs of the adjustable amplifier circuits 511-514 and the adjustable time or phase shifter circuits 521-524. The calibration control device 73 can control the time or phase shift of the adjustable time or phase shifter circuits 521-524 and the amplification factor of the adjustable amplifier circuits 511-514 via control outputs 72. The calibration control device 73 is further connected to a memory 71.

In general, in an antenna or an antenna array characteristics of the antenna or the antenna elements are initially unknown. For example, the characteristics of the antennas are subject to unavoidable errors and variations due to for example manufacturing tolerances and to various changes occurring as a function of time and temperature. For the sake of completeness, it should be noted that in the art of antenna arrays, a large number of estimation techniques are known to calibrate the characteristics of the antenna elements and/or the amplifier circuits and/or the time or phase shifter circuits. However, the known techniques are usually complicated and in general require mathematical optimisation of large matrices and hence a large amount of computational power.

The characteristics of the antenna array to be calibrated may for example be the, complex, gain and noise power of the antenna elements 41-44 and/or the signal shaper circuit 5. In particular the phase response and the amplification factor of the antenna elements are subject to such errors and have to be calibrated, to obtain a precise control of the antenna beam of the phased array antenna via the adjustable amplifier circuits 511-514 and the time or phase shifter circuits 521-524. The values of the calibrated characteristics may be stored in a memory device, such as the memory 71 in the control circuit 7 of FIG. 1, and be used by devices or circuits inside the satellite receiver, for example the signal processor circuit 6 or a beam former device (i.e. the control circuit 7 in the example of FIG. 1). The stored values may likewise be used by devices outside the satellite receiver, such as a control system which steers the direction of the antenna beam or otherwise.

In the examples of FIGS. 1-3 the characteristics of each of the antenna elements 41-44, the amplifier circuits 511-514 and the time or phase shifter circuits 521-524 are calibrated by the control circuit 7 and the calibration adjuster device 83. In particular, the amplification factors and the time or phase shifts are controlled by the calibration control device 73 via the control outputs 72 to estimate the actual characteristics of the time or phase shifts and the amplification factors of the antenna elements 41-44. Thus, the phase response and the amplification are calibrated by the control circuit 7 and the calibration adjuster device 83.

The calibration control device 73 can adjust the time- or phase shift and the amplification factor and perform an example of a calibration method according to the invention. In an example of a calibration method, a calibration signal representing calibration data is presented to the antenna array 4. The calibration signal can for example be emitted from a transmitter positioned at a known position with respect to the antenna array. In response to the calibration signal, the antenna elements 41-44 provide signals with different phases and amplitudes. Via the signal shaper circuit 5 and the signal processor circuit 6 the antenna signals are combined into a single antenna signal. The single antenna signal is then presented to the optimisation circuit 8.

In the optimisation circuit 8, the data error determining device 82 determines data errors in data represented by the antenna signal, for example by an error detection mechanism as explained above in more detail or otherwise. The calibration signal transmitted by the transmitter may represent some predetermined calibration data. The data error determining device 82 may comprise a calibration memory in which the predetermined calibration data are stored. Further the data error determining device may determine from the antenna signal received at the error input 81 received calibration data and compare the received calibration data from the signal with the known calibration data and thus determine data errors in the calibration signal. After determining the data errors in the antenna signal, the data error determining device 82 will provide an error signal representing a value of a characteristic of the data errors in the calibration signal to the calibration adjuster device 83. The value may for example be the BER (Bit Error Rate) or otherwise.

The data errors are inter alia dependent on whether or not the calibration control device 73 has set the time or phase shifts and the amplifications to a correct value. Thus a property of the data errors can be fed back to the calibration control device 73 as a measure of the calibration error. The calibration control device 73 may calibrate the characteristics in any suitable manner or order. The calibration control device 73 may for example calibrate each antenna element separately, for instance starting with the antenna element 41, then calibrating the antenna element 42 and thereafter the antenna element 43 etc. However, more complex calibration techniques may likewise be employed in the calibration control device 73.

In the example of FIG. 1, the calibration adjuster device 83 compares the actual error signal from the error output 825 with a previous error signal transmitted before the actual error signal and determines a change in the error signal. For example, if the error signal represents the BER, the calibration adjuster device 83 can determine an increase or decrease in the BER and accordingly determine that the difference between the estimated value of the characteristic, e.g. the amplification or phase shift, being calibrated and the actual value has to be increased or decreased. The calibration adjuster device 83 then outputs an calibration adjust signal. In response to the calibration adjust signal the calibration control device 73 adjusts the amplification and/or the time or phase shift, for example according to the determined change in the BER, e.g. if the BER has decreased, the calibration control device 73 continues adjusting the amplification and/or the time or phase shift in the same direction or if the BER has increased, the direction of the adjusting is reversed.

The calibration adjuster device 83 may likewise perform another operation on the error signal and the calibration control device 73 may likewise perform another method in response to a signal outputted by the calibration adjuster device 83. For example, the calibration adjuster device 83 may determine an expected maximum value or minimum value in the BER or perform some extrapolation operation on the BER based on previous error signals. The calibration control device 73 may determine in response an estimated value for the amplification and/or the time or phase shift and adjust the amplification and/or time or phase shift accordingly via the control outputs 72.

When the error signal provided by the data error determining device 82 satisfies some predetermined criterion, for example if the BER is below a predetermined threshold value, the data error does not change, or otherwise, the calibration adjuster device 83 determines that the characteristics are calibrated with sufficient accuracy. The calibration adjuster device 83 then outputs a stop signal to the calibration control device 73. In response to the stop signal, the calibration control device 73 terminates the calibration and stores the determined values of the calibrated characteristics, e.g. the phase shift and amplification, in the control memory 71.

The optimisation circuit 8 of FIG. 2 further comprises a polarisation adjuster device 84. Signals from a satellite are often transmitted as electromagnetic radiation with different polarisations, e.g. two orthogonal polarisations. The physical layer of the European satellite downlink system for example uses two linear orthogonal polarisations in the Ku band of 10-12 GHz, whereas other satellite systems use circular polarised signals. In the United States for example in the C-band of 4-8 GHz mostly a circular polarised signal is used since linear polarized signals are subject to polarisation shifts due to atmospheric influences in the C-band.

Use of polarised signals increases the data transmitting capacity of a satellite system. For example, a signal can be transmitted as an electromagnetic wave of a certain frequency with either a vertical or a horizontal polarisation. Thus, at that certain frequency two signals with different polarisation can be transmitted simultaneously. Hence more data can be transmitted in a given frequency band. The polarisation may be used in some or all frequencies of the used frequency band.

However, a satellite receiver for a satellite system which uses polarised signals has to be positioned correctly with respect to the polarised signals, because if the antenna in the satellite receiver is not arranged correctly for the reception of a certain polarisation, interference may appear between the orthogonal polarised signals in the same frequency band. Hence, some means are required to arrange the satellite receiver to receive the polarised signals as good as possible.

In the following, an optimisation of the direction of a polarisation of a satellite receiver with electronic means is described with reference to the example of a satellite receiver of FIG. 4. However, the optimisation may likewise involve some mechanical handling, e.g. positioning or rotating of the satellite receiver with respect to the transmitter or otherwise.

In the following, the optimisation of the direction of polarisation of the example of a satellite receiver 1' shown in FIG. 4 by way of example only will be explained. The satellite receiver 1' in FIG. 4 comprises two antenna arrays 401,402, each one suitable for receiving electromagnetic signals with a certain polarisation. In this example the polarisations are supposed to be linear. The satellite receiver 1' further comprises signal shaper circuits 501,502 connected to the antenna arrays. Each of the signal shaper circuits 501,502 is connected to a signal processor circuit 6 similar to the circuit 6 in FIG. 1. The signal processor circuits 6 combine the signals presented at the outputs of a signal shaper circuit 501,502 into a single signal, as has been explained above with reference to the satellite receiver in FIG. 1. The signal processor circuits 6 are connected with their outputs to a signal restore device 601.

The signal restore device 601 is connected to an optimisation circuit 8, which may for example be the optimisation circuit shown in FIG. 2.

Figure 4:
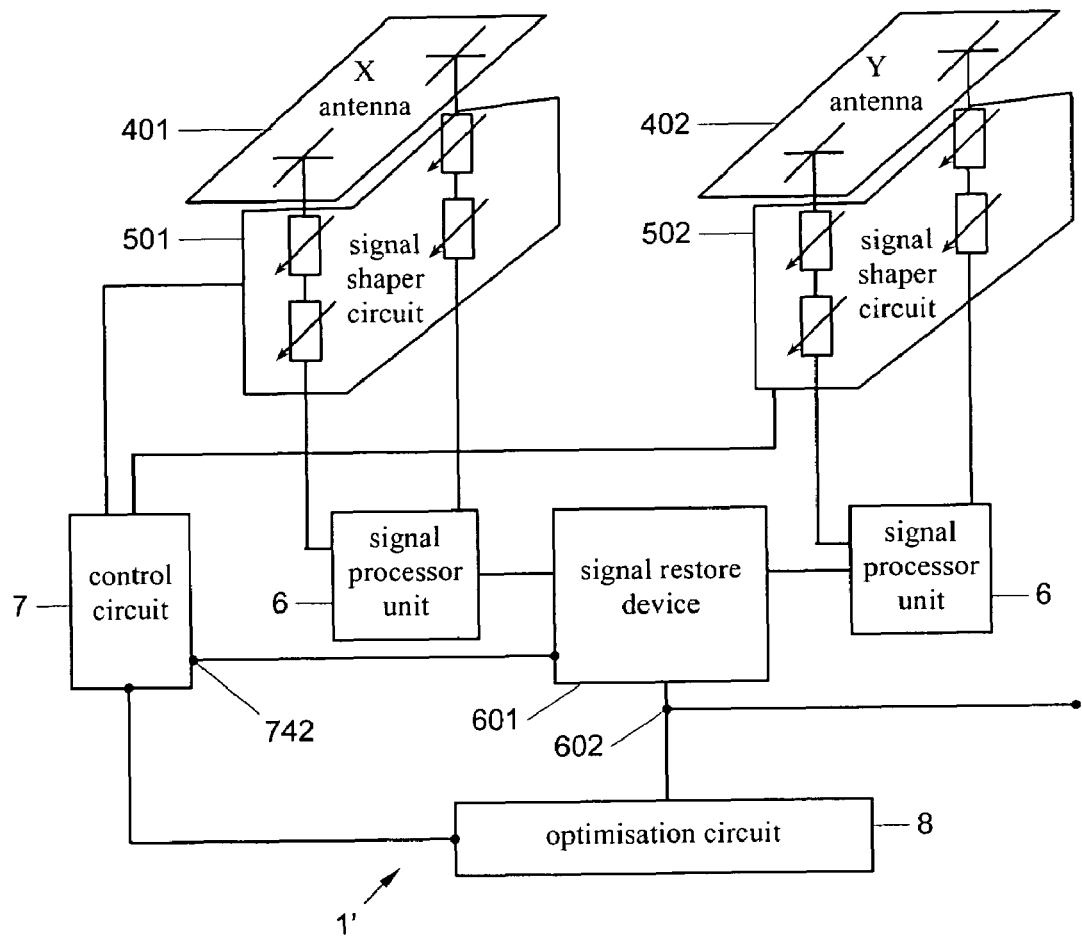
FIG. 4 schematically shows a block diagram of another example of an embodiment of a satellite system according to the invention.

In FIG. 4, the antenna arrays 401, 402 are shown positioned separate from each other. However, the antenna elements in the antenna arrays may likewise be positioned in an intermingled arrangement, for example in a two-dimensional matrix arrangement with alternately differently polarised antenna elements.

The antenna array 401 is suitable for receiving signals with a certain polarisation, and thus has a polarization X and is from hereon referred to as the. X-antenna 401. The antenna array 402 has a polarisation Y and is from hereon referred to as the Y-antenna 402. The polarisation of the Y-antenna 402 is orthogonal to the polarisation of the X-antenna 401. The antenna arrays 401,402 are each connected to a signal shaper circuit 501,502. Each signal shaper circuit 501,502 comprises adjustable amplifier circuits as well as adjustable time or phase shifter circuits, as have been explained before with respect to the signal shaper circuit 5 in the example of FIG. 1. The amplifications and phase shifts of the components of the signal shaper circuits 501,502 are controlled by a control circuit 7, which may for example be implemented as shown in FIG. 3.

Figure 5:
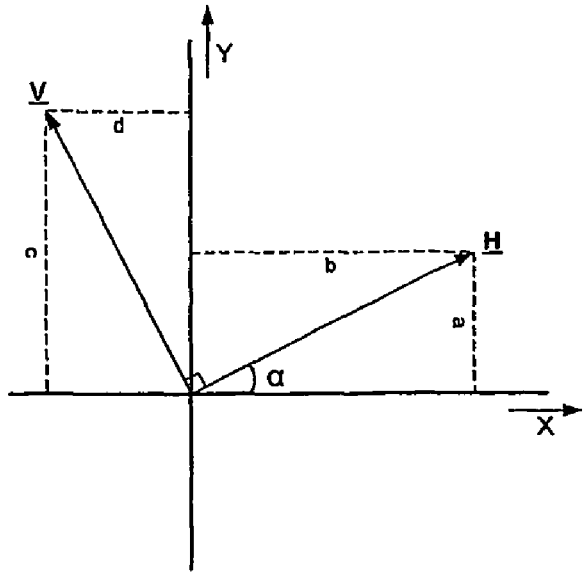
FIG. 5 shows a diagram showing polarised satellite signals and received satellite signals in case of a mismatch in polarisation angle.

The effect of a polarisation mismatch or off-set between the satellite receiver 1' and the transmitter or the satellite signal is graphically presented in FIG. 5. In FIG. 5, the axis X and Y represent the direction of the polarisation of the X-antenna 401 and the Y-antenna 402 respectively. The arrows V and H represent the direction of the polarisations of the satellite signals when transmitted by the satellite. The polarisation mismatch angle is represented by the symbol α. The antenna elements generate an signal equal to the projection of V and H on the axis X and Y, respectively. Thus, the X-antenna 401 generates a signal which comprises a combination of the differently polarised signals. The Y-antenna 402 generates a signal which is a combination of the differently polarised satellite signals as well.

The signals from the antenna elements are presented with suitable phase shift and amplification at the outputs of the signal shaper circuits 501,502 and combined by the corresponding signal processor 6 into an antenna signal. From hereon, the antenna signal stemming from the X-antenna 401 is referred to as the X-antenna signal and the antenna signal stemming from the Y-antenna 402 is referred to as the Y-antenna signal. The X-antenna signal and the Y-antenna signal are fed into a signal restore device 601.

The signal restore device 601 can perform an operation via which the satellite signals with different polarisations are extracted from the antenna signals. As is illustrated in FIG. 5, the antenna signals with polarisations X and Y are a (vector) sum of the original satellite signals with polarisations V and H, respectively.

The effect of the polarisation offset is graphically presented in FIG. 1. The axis X and Y represent the received signal of polarisations $\underline{V}$ and $\underline{H}$. The antenna elements generate a signal equal to X and Y (see FIG. 5). These signals are a (vector) sum of the original satellite signals $\underline{V}$ and $\underline{H}$. The signal on antenna element X and antenna element Y can be written mathematically as:

$$X = \underline{H}\cos(\alpha) - \underline{V}\sin(\alpha) \quad (1)$$

$$Y = \underline{H}\sin(\alpha) + \underline{V}\cos(\alpha) \quad (2)$$

Therefore, to recover the original satellite signals $\underline{H}$ and $\underline{V}$, the signals from antenna terminals X and Y are multiplied with sine and cosine, respectively. Thus, the signal restore device 601 is arranged to perform the mathematical operation:

$$\underline{H} = Y\sin(\alpha) + X\cos(\alpha) \quad (3)$$

$$\underline{V} = Y\cos(\alpha) - X\sin(\alpha) \quad (4)$$

The signal restore device 601 provides the restored satellite signals H and V as determined to a restored signal output 602. The restored signal output 602 which is connected to the input of the optimisation device 8 which in this example may be implemented as shown in FIG. 2. The restored signal output 602 may further be connected to other devices or circuitry, such as an output of the satellite receiver or otherwise.

In the preceding paragraphs, optimisation of a linear polarisation is described, however the signal restore device may likewise be implemented to optimise a circular polarisation, for example when the satellite signal is linear polarised and the antenna arrays are suitable for receiving circular polarised signals, e.g. a Right Circular Polarised (RCP) antenna and a Left Circular Polarised (LCP) antenna. According to basic electromagnetic laws, any polarisation can be expressed by two orthogonal polarisations. Hence, a linear polarisation can be presented as a sum of two orthogonal circular polarisations, for example a Right Circular Polarisation (RCP) and a Left Circular Polarisation (LCP). The signal restore device 601 may then be arranged to perform an operation corresponding to the mathematical expression:

$$Re\{U_{RCP} + U_{LCP}\} = h\cos(\omega t) = h$$

$$Re\{U_{RCP} - U_{LCP}\} = v\cos(\omega t) = v \quad (5, 6)$$

In this equation 5, 6, R{ } represents the real part of the complex quantity between the brackets, $U_{RCP}$ represents the antenna signal of the RCP antenna, $U_{LCP}$ represents the antenna signal of the LCP antenna, h,v represents the amplitude of the linear polarised satellite signals, ω represents the frequency of the signals, and v and h the polarised satellite signals.

In equation (6) it is assumed that the satellite signals are completely independent from each other, have amplitudes h and v, and a frequency ω. Thus, the satellite signals can be described mathematically as:

$$h = h\cos(\omega t)i_h \text{ and } v = v\sin(\omega t)i_v \quad (7)$$

In equation 7, $i_h$, $i_v$ represent the unit vectors in corresponding directions. The signal h is divided in two parts: an RCP signal with amplitude h/2 and an LCP signal with same amplitude h/2. The signal v is divided in two parts: an RCP signal with amplitude v/2 and an LCP signal with same amplitude v/2. The signals h and v can be expressed in the mathematical complex plane as:

$$h = \frac{h}{2}e^{j\omega t} + \frac{h}{2}e^{-j\omega t} \text{ and} \quad (8)$$

$$v = \frac{v}{2}e^{j\omega t} - \frac{v}{2}e^{-j\omega t}$$

The parts in equation 8 containing $e^{j\omega t}$ present the RCP signal portion and the other parts containing $e^{-j\omega t}$ present the LCP signal portion. At the satellite linear polarized satellite signals are transmitted. The RCP antenna will receive the signal:

$$U_{RCP} = \frac{h}{2}e^{j\omega t} + \frac{v}{2}e^{j\omega t} \quad (9)$$

And the LCP antenna will receive the signal:

$$U_{LCP} = \frac{h}{2}e^{-j\omega t} - \frac{v}{2}e^{-j\omega t} \quad (10)$$

From the expressions 7-10, it can be derived mathematically that the satellite signal can be restored from the antenna signals by an operation corresponding to equation 6. Thus, with a simple summation of the two circular polarised antenna signals, the linear polarised satellite signals can be restored. However, in case of a mismatch in polarisation planes, i.e. a difference in the plane of polarisation of the satellite signals and the antenna's the result of the operation represented by equation 6 may be corrected further by performing the mathematical operation on the determined signals h,v:

$$x = \frac{h}{\cos\delta} \quad (11)$$

$$y = \frac{v}{\cos\beta} + h\tan(\delta)\tan(\beta)$$

In equation 11, δ represents the mismatch angle in the horizontal plane, β represents the mismatch angle in the vertical plane and x, y represent the restored signals.

The error determining device 82 in the optimisation device 8 determines data errors in the restored signals and outputs the error signal representing a measure of the data errors to the optimisation adjust device. The optimisation adjust device 84 determines from the error signal whether or not the signal restore device 601 operates correctly. For example, the polarisation adjust device 84 may determine that the BER exceeds some predetermined threshold value for one ore more of the polarisations. The polarisation adjust device 84 may then provide a threshold exceed signal to the polarisation control device 74 which in response may determine whether or not the polarisation mismatch angle α used in the signal restore device 601 has to be adjusted. If the polarisation control device 74 determines that the angle has to be adjusted, the polarisation control device 74 outputs an angle adjust signal at a polarisation control output 742 connected to a control input of the signal restore device 601. The signal restore device 601 then adjusts the angle α in response to the adjust signal.

It should be noted that the polarisation adjust device 84 and the polarisation control device 74 may likewise control the signal restore device 601 in a different manner, for example by adjusting another property of the signal restore device 601 or controlling the mismatch angle in a different manner. For example, the polarisation adjust device 84 may output different signals for the different data errors in the signals of the different polarisations. The polarisation control device may then determine from differences between the data errors in the different polarisation directions the amount of correction required for the mismatch angle.

Figure 6:
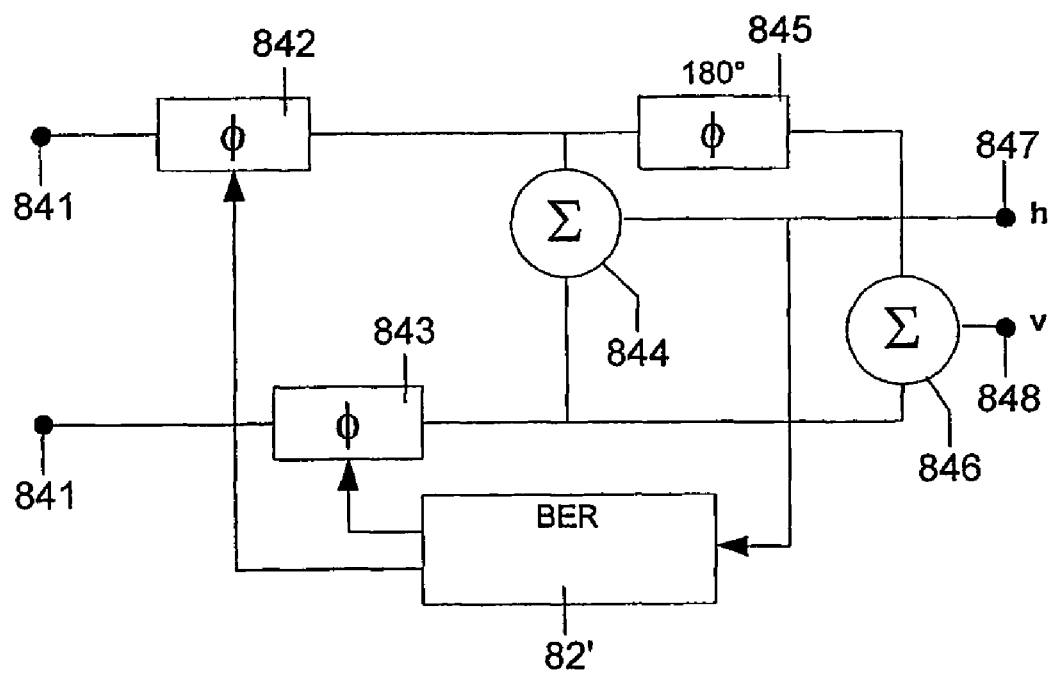
FIG. 6 shows an example of a polarisation control device suitable for in an example of a satellite system according to the invention.

FIG. 6 shows an example of an implementation of the polarisation control. The control comprises two inputs 841, each for an antenna signal, with one polarisation can be inputted. The inputs 841 are each connected to a variable phase control 842,843. The phase of the variable phase controls 842,843 is controlled separately by an output signal of an error detector 82'. The outputs of the variable phase controls 842,843 are each connected to a separate input of an first combiner 844. The first combiner 844 has a combiner output 847 at which the original satellite signal h of one polarisation is presented. This output is connected to the input of the error detector 82'. The output of the one of the variable phase controls 842 is further connected to a phase shifter 845 which provides an 180-degrees phase shifted signal to an input of a second combiner 846. Another input of the second combiner 846 is connected to the output of the other variable phase control 843. The second combiner provides the original Satellite signal v of the other polarisation at its combiner output 848. Thus, in this example only the original satellite signal of one polarisation is used to optimise the polarisation.

The optimisation circuit 8 of FIG. 2, further comprises a beam adjuster device 85 and the control circuit 7 shown in FIG. 3 comprises a beam control device 75. Thus, the beam of the antenna array 4 resp. 401-402 can be controlled. The beam adjuster device 85 can determine a value of one or more properties of the data errors related to one or more properties of the antenna beam from the error signal provided at the output 825 of the data error determiner device 82. The beam adjuster device 85 can output an adjust signal depending on the determined value to the beam control device 75. For example, if the BER exceeds some predetermined threshold value, the beam adjuster device 85 may determine that the direction of the antenna beam has to be adjusted and provide a beam adjust signal. The beam adjuster device 85 may however operate differently. For example, the beam adjuster may determine from the error signal an estimated value of a property of the antenna beam and compare the estimated value with a reference value and provide a beam adjust signal when the estimated value differs too much from the reference value.

In response to the adjust signal, the beam control device 75 can adjust one or more properties of the antenna beam, such as the direction, width or otherwise. In the example of FIG. 3, the beam control device 75 has an output 752 via which the amplification factor of the amplifier circuits 511-514 and/or the phase or time shift time of the phase shifter circuits 521-524 is controlled. It should be noted that the control of an antenna beam of an array is generally known in the art of antenna arrays, and for the sake of brevity the control of the beam is not described in full detail.

The optimisation circuit 8 may comprise an attenuator device between the optimisation input 81 and the data error determining device 82. The attenuator device changes the amplitude of the received signal before determining the data error from the data. Thereby, the signal received at the error input 821 can be regarded as generated by a virtual antenna array with a virtual antenna beam, which differs from the real antenna beam, i.e. which has an increased number of errors compared to the real antenna beam. Thereby, the data error determining device 82 and the beam adjuster device 85 operate on the virtual antenna array thus preventing that the quality of the received real antenna signal becomes too low. Furthermore, in case the real antenna beam is adjusted, the error rate in the signals may become very low and may be not detectable anymore without the real antenna beam being fully optimised. The virtual antenna beam has an increased error rate compared to the real antenna beam and may thus have an error rate above the minimum level that is detectable. Because of the virtual antenna beam with an increased number of errors, the real antenna beam can thus be optimised even when the error rate in the signals from the real antenna is below level of detection.

When the satellite and/or the satellite receiver move with respect to each other, the beam adjuster device 85 can adjust the antenna beam to automatically redirect the antenna beam to point in the direction of the satellite. Thus, automatic tracking of the satellite is obtained.

It should be noted that the above-mentioned embodiments illustrate rather than limit the invention, and that those skilled in the art will be able to design alternatives. Examples of the invention have been described above applied to the calibration, the polarisation and the antenna beam of an antenna array. However, the invention may likewise be applied to different properties of a satellite system, such as the position of the transmitter with respect to the satellite receiver (e.g. of an antenna with respect to satellite) or otherwise.

Furthermore, the invention is not limited to application in a satellite receiver with an antenna array, but may likewise be applied to satellite receivers with other antennas. Furthermore, the invention can likewise be applied as a data carrier comprising data representing a computer program product, comprising program code for performing steps of a method according to the invention when run on a programmable device. Such a data carrier can for example be a read only memory compact disk (CD-ROM) or a signal transfer medium, such as a telephone cable or a wireless connection. The programmable device may be of any suitable type. For example, it may be a computer communicatively connected to an antenna array. However, the computer may likewise not be connected to a sensor array, but receive data representing signals from the array, e.g. via a floppy disk or a compact disk.

In the claims, any reference signs placed between parentheses shall not be construed as limiting the claim. The word 'comprising' does not exclude the presence of other elements or steps than those listed in a claim. Furthermore, the words 'a' and 'an' shall not be construed as limited to 'only one', but instead are used to mean 'at least one'. The mere fact that certain measures are recited in mutually different claims does not indicate that a combination of these measures cannot be used to advantage. Also, unless specified otherwise in this application the term 'connected' comprises connected via any appropriate means suitable to transfer a signal such as, but not limited to, a physical connection (such as a coax cable, a copper wire or otherwise), a wireless connection (e.g. a radio connection or otherwise) or otherwise.

The invention claimed is:

1. A method for optimising at least one property of a satellite system, the satellite system having a satellite provided with a transmitter for transmitting a satellite signal representing data, and a satellite receiver comprising an antenna array with at least two antenna elements for receiving said satellite signal, wherein the method comprises the steps of:

receiving, at said satellite receiver, the satellite signal so as to define a received satellite signal;

determining, from the received satellite signal, received data;

checking said received data for an amount of data errors; and if a result of said checking satisfies a predetermined criterion, changing gain, phase or electrical delay of at least one of said at least two antenna elements.

2. The method recited in claim 1 wherein the changing step further comprises the step of changing a polarisation of the satellite receiver.

3. The method recited in claim 2 wherein the polarisation is either linear or circular.

4. The method recited in claim 1 wherein the antenna array comprises an electrically tunable antenna array.

5. The method recited in claim 1 wherein the antenna array comprises a phased array antenna.

6. The method recited in claim 1 further comprising the step of calibrating at least one of the antenna elements.

7. The method recited in claim 1 further comprising the step of optimising at least one property of an antenna beam of the satellite receiver.

8. The method recited in claim 7 further comprising the step of changing amplitude of the satellite signal before determining the data from the satellite signal.

9. The method recited in claim 1 wherein the data represented by the satellite signal is encoded data, said encoded data having been encoded by means of a coding algorithm, and wherein said determining step comprises the step of decoding the data with a suitable decoding algorithm; and the received data checking step comprises the step of determining the data errors from the decoded data.

10. The method recited in claim 9 wherein the data represented by the satellite signal is encoded with an MPEG-2 compliant coding algorithm.

11. The method recited in claim 9 wherein the data represented by the satellite signal is encoded with a forward error correction coding algorithm.

12. The method recited in claim 9 wherein the data represented by the satellite signal is encoded with a Viterbi coding algorithm.

13. The method recited in claim 9 wherein the data represented by the satellite signal is encoded with a Reed-Solomon coding algorithm.

14. The method recited in claim 1 wherein the result satisfies the predetermined criterion if a ratio of an amount of the data errors relative to an amount of data exceeds a predetermined threshold value.

15. The method recited in claim 14 wherein the ratio is a bit error ratio.

16. An optimisation device for a satellite receiver, the optimisation device comprising:

an optimisation input connectable to at least one signal output of the satellite receiver for receiving at least one received satellite signal representing received data;

a data error determining section communicatively connected to the optimisation input, for determining an amount of data errors in said received data;

a comparator for comparing the amount of data errors with a predetermined criterion, said comparator having a comparator output for providing an adjust signal if the amount of data errors satisfies said predetermined criterion;

wherein the receiver comprises an antenna array with at least two antenna elements;

the optimisation device further comprises an adjuster device for adjusting gain, phase or electrical delay of at least one of the antenna elements in response to the adjust signal from the comparator output.

17. A satellite receiver, comprising at least two antenna elements;

a control device arranged for controlling gain, phase or electrical delay of at least one of the antenna elements; said control device having an input for receiving a control signal and an output connected to a control input of the antenna elements; and at least one optimisation device as recited in claim 16 communicatively connected with its optimisation input to a signal output of said at least one antenna element and connected with an optimisation output to the input of the control device for adjusting gain, phase or electrical delay of said at least one of the antenna elements.

18. A satellite system comprising a satellite with a signal source arranged for transmitting a satellite signal representing binary data and at least one satellite receiver as recited in claim 17 for receiving the satellite signal.

19. A computer readable media having machine executable instructions stored thereon for enabling a programmable device to perform steps of the method as recited in claim 1 when the instructions are executed on said programmable device.

* * * * *